James H. Rowley.
CHURN.
72087
PATENTED
DEC 10 1867
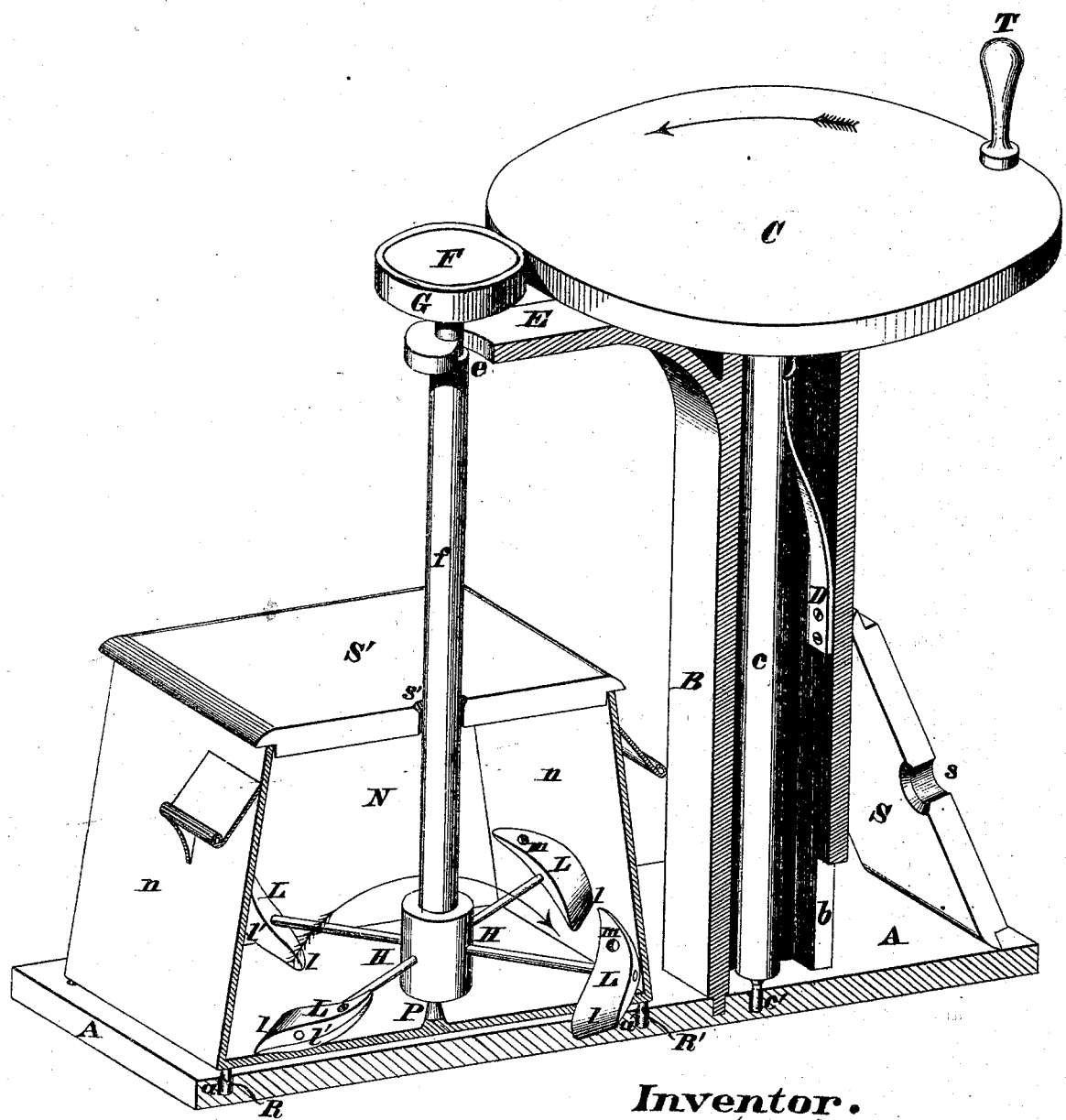
Inventor.
J. H. Rowley
By Knight Bros
Attys.
Attest.
Jas. H. Layman
Jos. A. Meader

United States Patent Office.

JAMES H. ROWLEY, OF VANCEBURG, KENTUCKY.

Letters Patent No. 72,087, dated December 10, 1867.

IMPROVEMENT IN CHURNS.

The Schedule referred to in these Letters Patent and making part of the same.

TO ALL WHOM IT MAY CONCERN:

Be it known that I, JAMES H. ROWLEY, of Vanceburg, Lewis county, Kentucky, have invented a certain new and useful Improvement in Churns; and I do hereby declare the following to be a full, clear, and exact description thereof, reference being had to the accompanying drawing, making part of this specification.

My invention relates to that class of churns in which the butter is produced by dashers revolving in a horizontal plane, and the main feature of my improvements consists in imparting a high velocity to said dashers by means of friction-wheels, thereby dispensing with gearing or belts; the first of which is objectionable on account of its cost and the noise produced by it when in operation, and the latter is never reliable, because it is effected by the change of temperature, being too tight at some times and too slack at others.

In the accompanying drawing a churn embodying my improvements is shown by a longitudinal section partially in perspective.

A represents the base or bed-plate of the apparatus, and rising vertically from this bed-plate is a standard, B, which encloses the shaft $c$ of the driving-wheel C, and also a spring, D, which is constantly pressing against said shaft $c$, for a purpose which will be hereafter explained. The lower end of the shaft $c$ is provided with a journal, $c'$, which has its bearing within the bed-plate A, and the driving-wheel, together with its shaft and journal-bearing, can be detached from the apparatus by simply lifting it out of the standard B. Projecting horizontally from the standard B is a bracket, E, notched at $e$ to receive the shaft $f$ of a friction-pulley, which consists of a disk, F, whose periphery has secured to it a band, G, of India rubber, leather, or other suitable material. The lower portion of the shaft $f$ is provided with a number of horizontal arms, H, whose outer ends have attached to them dashers L, which are set obliquely to said arms. The faces I of these dashers, which oppose the cream as they are rotated, are flat, excepting their lower ends $l$, and these are rounded off, so as to enable the cream to ascend the inclined flat faces I with the least amount of resistance. The backs, $l'$, of the dashers are also rounded, so as to allow the particles of cream to rush together behind the dashers when they are operating, thereby increasing the agitation. The apertures $m$ in the upper part of the dashers also serve to increase the agitation. The dashers revolve within a cream-chamber, N, which is square in its horizontal section, and its sides $n\ n$ have the represented inwardly inclined form. These inclined sides compel the cream to be deflected therefrom, and to fall back in the centre of the vessel, and the angular shape of said vessel breaks up the vortex caused by the rotation of the dashers, and produces counter currents and eddies in the cream, which greatly increase the agitation. The bottom of the cream-chamber has an upwardly-projecting stud, P, which serves as a journal for the lower end of the dasher-shaft $f$. R R' are lugs, which are attached to the cream-chamber, and these lugs enter suitable sockets $a\ a'$ in the bed-plate, and thereby confine the cream-chamber in its proper position. This provision of the lugs and sockets permits of the cream-chamber being detached from the bed-plate in a minute's time, whenever it is desired to empty or cleanse said chamber. The top of the chamber is closed by two lids S S', which have central apertures $s\ s'$ for the admission of the dasher-shaft. T is the handle by which the driving-wheel C is rotated in the direction indicated by the red arrow. $b$ is an opening in the bottom of standard B, to permit of the journal-bearing $c'$ being oiled, and it also enables the operator to insert the bearing in its proper position after it has been removed. The spring D retains the driving-wheel C in contact with the friction-pulley F G with a constant and uniform pressure, and, owing to the direction in which the dasher-shaft $f$ is rotated, it has no tendency to escape from the notched bracket E $e$.

The provision of the spring D is a feature peculiar to my churn, and the apparatus would not be as effective as it now is if it was omitted, as it makes no difference how much the shafts may wear or get out of line, for the spring will always keep the operating parts in contact with each other.

I claim herein as new, and of my invention—

The arrangement, substantially as described, of the driving-wheel C, shafts $c\ c'$, spring D, notched bracket E $e$, and friction-pulley F G, for the purpose of imparting a rotary motion to the dasher-shaft $f$ in the manner herein described and set forth.

In testimony of which invention, I hereunto set my hand.

JAMES H. ROWLEY.

Witnesses:
  GEO. H. KNIGHT,
  JAMES H. LAYMAN,